United States Patent

[11] 3,554,204

[72] Inventor Robert H. Bellman
    Horseheads, N.Y.
[21] Appl. No. 676,803
[22] Filed Oct. 20, 1967
[45] Patented Jan. 12, 1971
[73] Assignee Corning Glass Works
    Corning, N.Y.
    a corporation of New York

[54] SYSTEM FOR DETERMINING THE RATE CHANGE OF PRESSURE
    7 Claims, 4 Drawing Figs.

[52] U.S. Cl. ........................ 137/81.5
[51] Int. Cl. ........................ F15c 1/14
[50] Field of Search ............... 137/81.5

[56] References Cited
    UNITED STATES PATENTS

| | | | |
|---|---|---|---|
| 3,238,959 | 3/1966 | Bowles | 137/81.5 |
| 3,159,168 | 12/1964 | Reader | 137/81.5 |
| 3,266,510 | 8/1966 | Wadey | 137/81.5 |
| 3,333,596 | 8/1967 | Bottone, Jr. | 137/81.5 |
| 3,379,204 | 4/1968 | Kelley et al. | 137/81.5 |
| 3,413,996 | 12/1968 | Fine | 137/81.5 |
| 3,474,959 | 10/1969 | Katz | 137/81.5X |

FOREIGN PATENTS

| 1,002,089 | 8/1965 | Great Britain | 137/81.5 |

Primary Examiner—Samuel Scott
Attorneys—Clarence R. Patty, Jr. and Walter S. Zebrowski ABSTRACT: A rate of change of pressure detector employing an open loop circuit where the control nozzles of a proportional fluid amplifier are connected to a pressure source, whose rate of change of pressure is to be measured, by a pair of passages one of which is longer than the other. The pressure at the pressure source is differentiated to provide a pressure difference at the outlets of the proportional fluid amplifier which is a function of the rate of change of pressure of said pressure source in accordance with the equation $$\Delta P_o = G_P K \frac{(I_1 - L_2)}{c}$$

INVENTOR.
ROBERT H. BELLMAN
BY
*Walter S. Zebrowski*
ATTORNEY

SYSTEM FOR DETERMINING THE RATE CHANGE OF PRESSURE

BACKGROUND OF THE INVENTION

Heretofore known means for determining the rate of change of pressure have been complicated, delicate, and expensive. One example of prior art methods is as follows. Change of pressure was measured by pneumatic or fluidic means and then such fluidic signals were converted to electrical signals which were subsequently applied to an electrical circuit or computer that differentiated them to provide rate of change. As is readily seen, such a system or method is very complicated employing costly equipment which was subject to damage or error in practical applications.

Unlike an ordinary bistable "lock-on" type fluid amplifier wherein the power locks on to one wall or the other of an interaction chamber and the power stream is directed substantially entirely to one or the other of a pair of outlet passages in response to fluid signals applied to the control nozzles thereof, a proportional fluid amplifier does not lock on to either wall and distributes or apportions the power stream between the outlet passages in response to the pressure differential across the control nozzles. A proportional fluid amplifier is therefore a fluidic analogue device. Proportional fluid amplifiers may be either of the vent-type or center dump type. In either case, depending on the difference in pressures applied to the control nozzles the power stream may be directed entirely to one outlet passage or the other, proportioned between them, or may be deflected beyond both and vented to ambient. The gain of a proportional fluid amplifier is determined by the ratio of the difference between the pressures within the outlet passages to the difference of the pressures applied to the control nozzles.

SUMMARY OF THE INVENTION

The objects of the present invention are to provide a simple, direct, rugged, and inexpensive means for determining the rate of change of pressure which overcomes the heretofore noted disadvantages.

According to the present invention, a system for determining the rate of change of pressure comprises a proportional fluid amplifier, one of the control nozzles of which is connected to the source of pressure to be sensed by means of a first passage intermediate said source and the control nozzle, while the other control nozzle of the proportional fluid amplifier is connected by means of a second passage to said pressure source, the second passage being longer than the first passage. The pressure difference $\Delta P_o$ at the outlets of said proportional fluid amplifier is a function of the rate of change of pressure of said pressure source in accordance with the equation $$\Delta P_o = G_P K \frac{(L_1 - L_2)}{c}$$

where $G_P$ is the gain of the proportional fluid amplifier, $K = dP/dt$, $L_1$ is the length of the second passage, $L_2$ is the length of the first passage, and $c$ is the speed of sound.

Additional objects, features, and advantages of the present invention will become apparent to those skilled in the art from the following detailed description and the attached drawings on which, by way of example, only the preferred embodiments of this invention are illustrated.

DETAILED DESCRIPTION

By the term fluid as used herein is meant any compressible fluid such as air, nitrogen, or other gases or incompressible fluid such as water or the like, which fluids may contain solid particles. This invention is not limited to any particular fluid.

Figure 1:
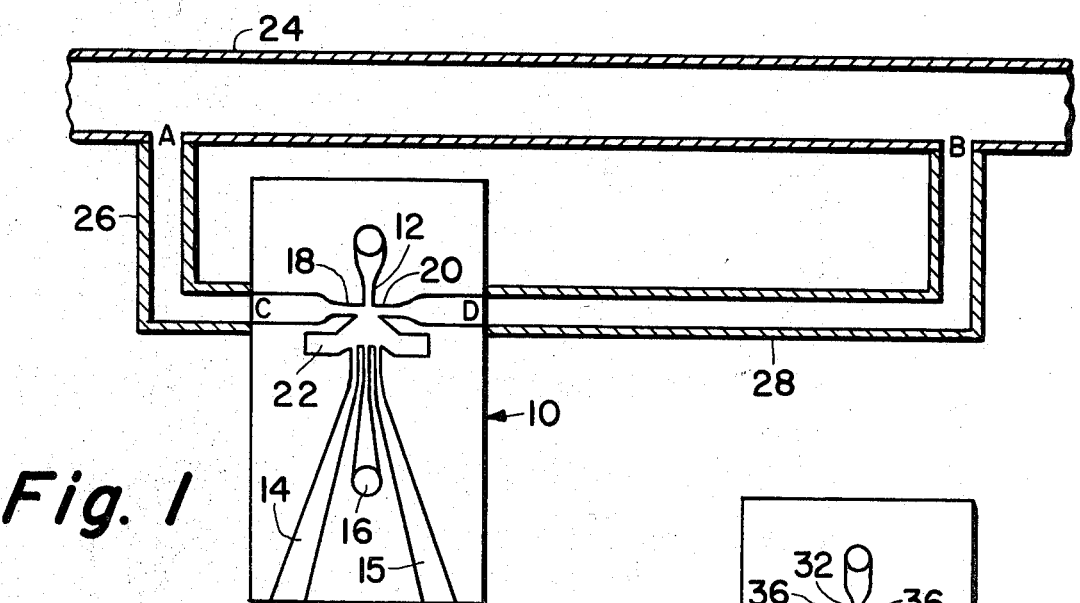
FIG. 1 is a plan view of one embodiment of a system for determining the rate of change of pressure.

FIG. 1 illustrates one embodiment of a system embodying an open circuit for determining the rate of change of pressure including a center dump-type proportional fluid amplifier 10. Such a proportional fluid amplifier is one wherein the power stream emitted from power nozzle 12 is directed to one or the other of outlet passage 14 and 15 or the center vent or dump passage 16 in proportion to the magnitude of the fluid control signals applied to control nozzles 18 and 20. Entrainment fluid flow and venting of excess fluids is accomplished by means of passage 22 which is opened to ambient. Control nozzle 18 of proportional fluid amplifier 10 is connected to a source of pressure within chamber 24 by means of passage 26, while control nozzle 20 is connected to this same pressure source by means of passage 28. For reasons hereinafter explained, the length of passage 28 is greater than the length of passage 26. The outlets 14 and 15 of proportional fluid amplifier 10 are connected to suitable pressure sensing means, not shown, such as a gauge, meter, alarm, Schmitt Trigger, and the like. One familiar with the art can readily select suitable pressure sensing means for a particular application.

Figure 4:
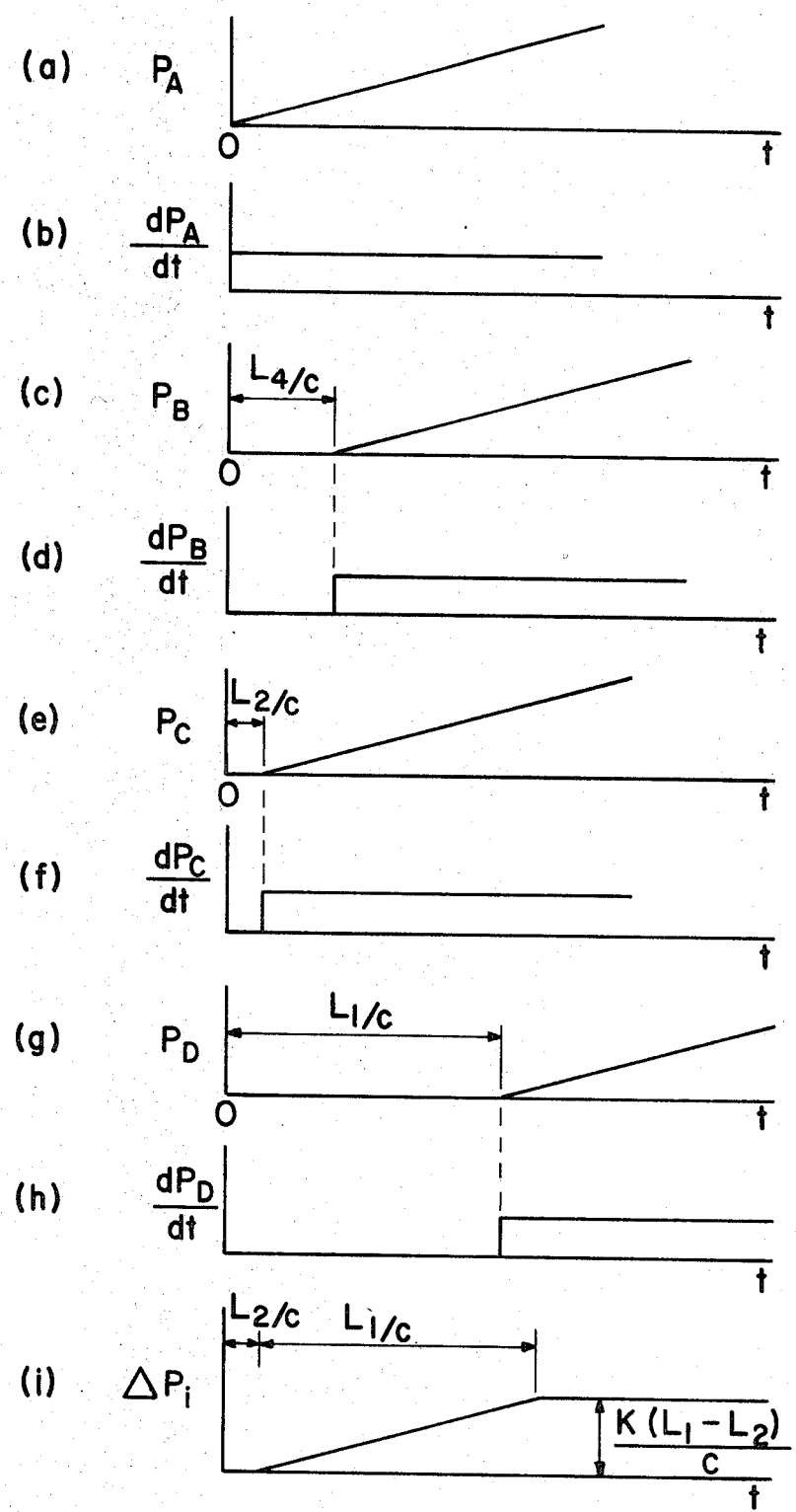
FIG. 4 represents several graphs illustrating the pressure conditions of the system of this invention.

The operation of the system illustrated in FIG. 1 is as follows. As the pressure within chamber 24 changes, the pressure $P_A$ at point A located at the intersection of passage 26 and chamber 24 at any given time will be (1) $$P_A = \int_0^t \frac{dP_A}{dt} dt$$

where $t$ is time. This is also illustrated by FIGS. 4(a) and 4(b). Referring additionally to FIGS. 4(c) and 4(d), pressure $P_B$ at point B located at the intersection of passage 28 and chamber 24 at any given time is represented by the equation (2) $$P_B = \int_{L_4/c}^t \frac{dP_B}{dt} dt$$

where $L_4$ is the distance between points A and B, and $c$ is the speed of sound at ambient The equation representing the pressure $P_C$ at point C, the entrance to control nozzle 18 of the proportional fluid amplifier, is (3) $$P_C = \int_{L_2/c}^t \frac{dP_C}{dt} dt$$

where $L_2$ is the length of passage 26 between points A and C. Reference is also made to FIGS. 4(e) and 4(f). The pressure $P_D$ at any given time at point D, the entrance to control nozzle 20, is represented by the equation (4) $$P_D = \int_{L_1/c}^t \frac{dP_D}{dt} dt$$

where $L_1$ is the distance between points A and D through chamber 24 and passage 28. This is also illustrated by FIGS. 4(g) and 4(h). The distance between points B and D is $L_3$ so that (5) $$L_1 = L_3 + L_4$$

Referring now additionally to FIG. 4(i), $\Delta P_i$ the pressure difference at the inlet to the proportional fluid amplifier at points C and D is represented by the equation (6) $$\Delta P_i = P_C - P_D$$

Substituting equations (3) and (4) in equation (6)

(7) $$\Delta P_i = \int_{L_2/c}^t \frac{dP_C}{dt} dt - \int_{L_1/c}^t \frac{dP_D}{dt} dt$$

If (8) $$\frac{dP}{dt} = K \text{(Constant)}$$

then (9) $$\Delta P_i = (Kt)^t_{L_2/c} - (Kt)^t_{L_1/c}$$

or

(10) $$\Delta P_i = K \frac{(L_1 - L_2)}{c} \text{ when } t > \frac{L_1}{c} \text{ and } L_1 > L_2.$$

The pressure difference $\Delta P_o$ at outlets 14 and 15 of the proportional fluid amplifier 10 is represented by the equation

(11) $$\Delta P_o = G_P \Delta P_i$$

where $G_P$ is the gain of the proportional fluid amplifier. Substituting equation (10) in equation (11)

(12) $$\Delta P_o = G_P K \frac{(L_1 - L_2)}{c}$$

The pressure difference $\Delta P_o$ at outlets 14 and 15 of the proportional fluid amplifier 10 is represented by the equation

(11) $$\Delta P_o = G_P \Delta P_i$$

where $G_P$ is the gain of the proportional fluid amplifier. Substituting equation (10) in equation (11)

(12) $$\Delta P_o = G_P K \frac{(L_1 - L_2)}{c}$$

The pressure difference $\Delta P_o$ at the outlets of the proportional fluid amplifier is a function of the first derivative of the pressure difference at the inlet to said amplifier or a rate of change of pressure of the pressure source. Equation (12) is suitable for use where $L_1/c$ is less than the time it takes for the pressure to build up within container 24. As heretofore noted, $L_1$ must be greater than $L_2$.

The system described above is suitable as a means for detecting the stall condition of a jet engine. For example, if chamber 24 is connected at the inlet to a jet engine, the engine stall condition can be detected by sensing the pressure differential at the outlet of proportional fluid amplifier 10 which pressure differential will be a function of the rate of change of pressure at the engine inlet. As is well known in the art, a predetermined pressure change rate will occur at the inlet to the engine when it stalls. In a typical example, a 10 p.s.i. per second rate of pressure change at stall producing a total pressure rise at the inlet of a jet engine of 0.02 p.s.i. can be detected by the proportional fluid amplifier connected to the engine inlet as heretofore described. The outlets of the amplifier can be connected to, for example, an alarm system or an engine shutoff system. With a proportional fluid amplifier having a gain of 100:1 and where $L_1$ is 12 inches and $L_2$ is 1 inch, $\Delta P_o$ would be about 1 p.s.i.

Figure 2:
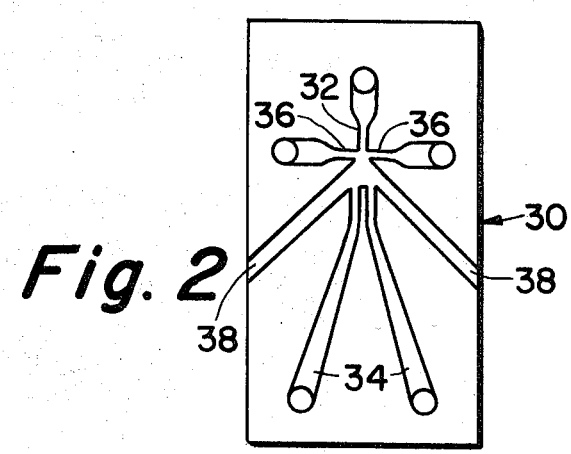
FIG. 2 is a plan view of a vent-type proportional fluid amplifier.

Referring to FIG. 2 there is illustrated a vent-type proportional fluid amplifier 30. Such a proportional fluid amplifier is one wherein the power stream emitted from nozzle 32 is directed to one or the other or both of the outlet passages 34 in proportion to the magnitude of the fluid signals applied to the control nozzles 36. Entrainment fluid flow and venting of excess fluids is accomplished by means of vents 38.

Figure 3:
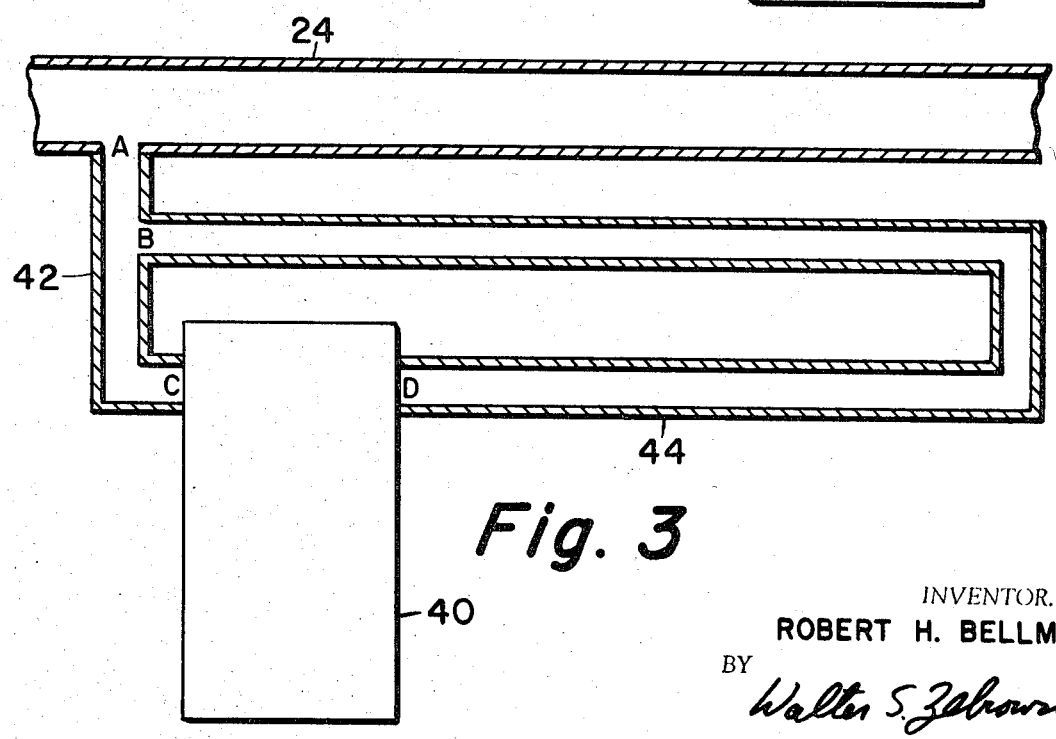
FIG. 3 is a plan view of another embodiment of a system for measuring the rate of change of pressure.

Referring now to FIG. 3, another embodiment of the present system for determining the rate of change of pressure is illustrated. A single connection is made at point A to a suitable chamber 24 which provides a pressure source. One control nozzle of proportional fluid amplifier 40 is connected by means of passage 42 to chamber 24. The length of this passage between points A and C is equal to $L_2$ in equation (12). The other control nozzle of proportional fluid amplifier 40 is connected by means of passage 44 to chamber 24 through an intermediate connection to passage 42 at point B. The pressure at points C and D is represented by equations (3) and (4) respectively wherein $L_1$ is the length of passage ABD or the distance between points A and D through passage 44 and $L_2$ is the length of passage 42. The operation of this system is identical with that described in connection with FIG. 1 in that the pressure difference at the outlets of proportional fluid amplifier 40, an analogue device, is a function of the first derivative or rate of change of pressure of the pressure source as sensed at the control nozzles of the proportional fluid amplifier.

I claim:

1. A system for determining the rate of change of pressure comprising:
   a proportional fluid amplifier having a power stream nozzle, a pair of control nozzles, and a pair of outlets;
   a pressure source;
   a first passage intermediate said pressure source and one of said control nozzles to transmit fluid from said pressure source to said one of said control nozzles; and
   a second passage intermediate said pressure source and the other of said control nozzles to transmit fluid from said pressure source to said other of said control nozzles, said second passage being longer than said first passage, the pressure difference $\Delta P_o$ at said outlets of said proportional fluid amplifier being a function of the rate of change of pressure at said pressure source in accordance with the equation $$\Delta P_o = G_P K \frac{(L_1 - L_2)}{c}$$

where $G_P$ is proportional fluid amplifier gain, $K = dP/dt$, $L_1$ is the length of the second passage, $L_2$ is the length of the first passage, and $c$ is the speed of sound.

2. The system of claim 1 further comprising pressure sensing means connected to the outlets of said proportional fluid amplifier.

3. The system of claim 2 wherein said means is a gauge.

4. The system of claim 1 wherein said first and second passages are connected to said pressure source at the same point.

5. The system of claim 4 further comprising pressure sensing means connected to the outlets of said proportional fluid amplifier.

6. The system of claim 1 wherein said first and second passages are connected to said pressure source at different spaced points.

7. The system of claim 6 further comprising pressure sensing means connected to the outlets of said proportional fluid amplifier.

UNITED STATES PATENT OFFICE
CERTIFICATE OF CORRECTION

Patent No. 3,554,204                    Dated January 12, 1971

Inventor(s)  Robert H. Bellman

It is certified that error appears in the above-identified patent and that said Letters Patent are hereby corrected as shown below:

Col. 1, line 17, insert --stream-- between "power" and "locks".

Abstract - line 10 in the equation $\frac{(I_1 - L_2)}{c}$ should be $\frac{(L_1 - L_2)}{c}$.

Col. 2, line 12 "passage" should be --passages--.

Col. 3, delete lines 7 through 16. This is a duplicate of lines 18 through 25.

Signed and sealed this 13th day of April 1971.

(SEAL)
Attest:

EDWARD M. FLETCHER, JR.          WILLIAM E. SCHUYLER, JR
Attesting Officer                 Commissioner of Patents